United States Patent

Kurita et al.

[11] Patent Number: 5,187,593
[45] Date of Patent: Feb. 16, 1993

[54] IMAGE PROCESSING APPARATUS FOR TEXTURE PROCESSING

[75] Inventors: Mitsuru Kurita; Yasumichi Suzuki, both of Tokyo; Yoshinori Ikeda, Kawasaki, all of Japan

[73] Assignee: Canon Kabushiki Kaisha, Tokyo, Japan

[21] Appl. No.: 517,337

[22] Filed: May 1, 1990

[30] Foreign Application Priority Data

May 10, 1989 [JP] Japan .................................. 1-117013

[51] Int. Cl.$^5$ .............................................. H04H 1/40
[52] U.S. Cl. .................................... 358/434; 358/443; 358/469
[58] Field of Search ............... 358/434, 436, 443, 445, 358/446, 447, 429, 455, 456, 465, 75, 80, 401, 406, 466, 469, 471

[56] References Cited

U.S. PATENT DOCUMENTS

| 4,163,234 | 7/1979 | Beno et al. | 342/169 |
| 5,021,876 | 6/1991 | Kurita et al. | 358/75 |

Primary Examiner—Edward L. Coles, Sr.
Assistant Examiner—Jerome Grant, III
Attorney, Agent, or Firm—Fitzpatrick, Cella, Harper & Scinto

[57] ABSTRACT

An image processing apparatus performs texture processing, wherein second image data is modulated in accordance with first image data, and a density of the output image is adjusted appropriately by adjusting a D.C. level or a A.C. level of the modulated second image data.

30 Claims, 10 Drawing Sheets

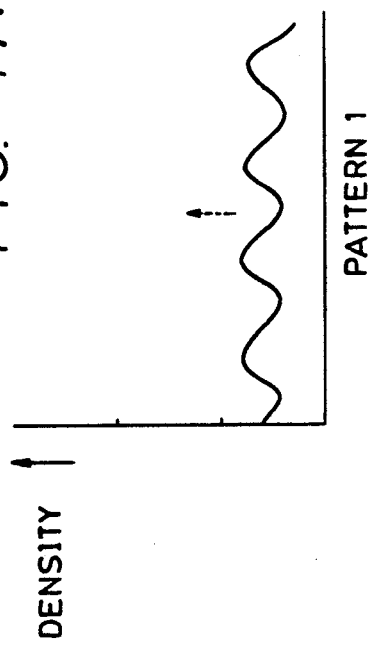
FIG. 4A
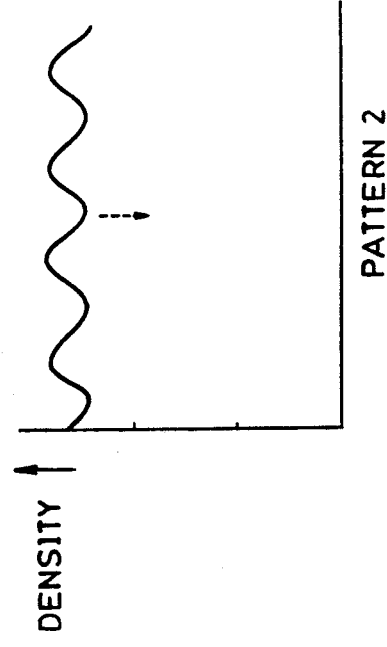
FIG. 4B
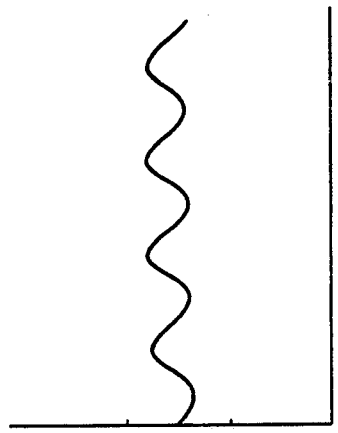
FIG. 4C

IMAGE PROCESSING APPARATUS FOR TEXTURE PROCESSING

BACKGROUND OF THE INVENTION

1. Field of the Invention

This invention relates to an image processing apparatus, and more specifically relates to an image processing apparatus which can modulate image data arbitrarily.

2. Related Background Art

Processing of input pixel data for density modulation using an arbitrary pattern has hitherto been performed using a costly printer or by means of computer processing, etc. (such processing is hereinafter referred to generically as "texture processing").

FIGS. 3A through 3C illustrate texture processing in which an image shown in FIG. 3A is modulated by a pattern shown in FIG. 3B to obtain an output image shown in FIG. 3C.

However, an image processing apparatus capable of performing texture processing in real time to output an image has not been available.

Texture processing also suffers from a problem in that it is affected by the density of the read pattern, i.e., the density of the whole output image is lightened when modulation by a pattern lighter than the image being modulated is performed, and is darkened when modulation by a darker pattern is performed.

Such texture processing is disclosed in U.S. Pat. No. 5,021,876 assigned in common with the present application.

SUMMARY OF THE INVENTION

Accordingly, an object of the present invention is to provide an image processing apparatus that can overcome the problems described above.

Another object of the present invention is to provide an image processing apparatus that performs image modulation processing and permits reproduction of images with high quality.

Still another object of the present invention is to provide an image processing apparatus that performs texture processing appropriately without being affected by the density of a texture pattern used in the modulation.

It is still another object of the present invention to provide an image processing apparatus that performs image modulation in accordance with another image, and capable of adjusting a level of modulated image data.

The other objects, features and advantages of the invention will become apparent from the following detailed description of the preferred embodiments of the present invention and the accompanying drawings.

BRIEF DESCRIPTION OF THE DRAWINGS

FIG. 4A-4C is a diagram for explaining an outline of automatic adjustment of the D.C. level of a pattern;

DETAILED DESCRIPTION OF THE PREFERRED EMBODIMENTS

Embodiment 1

Figure 1:
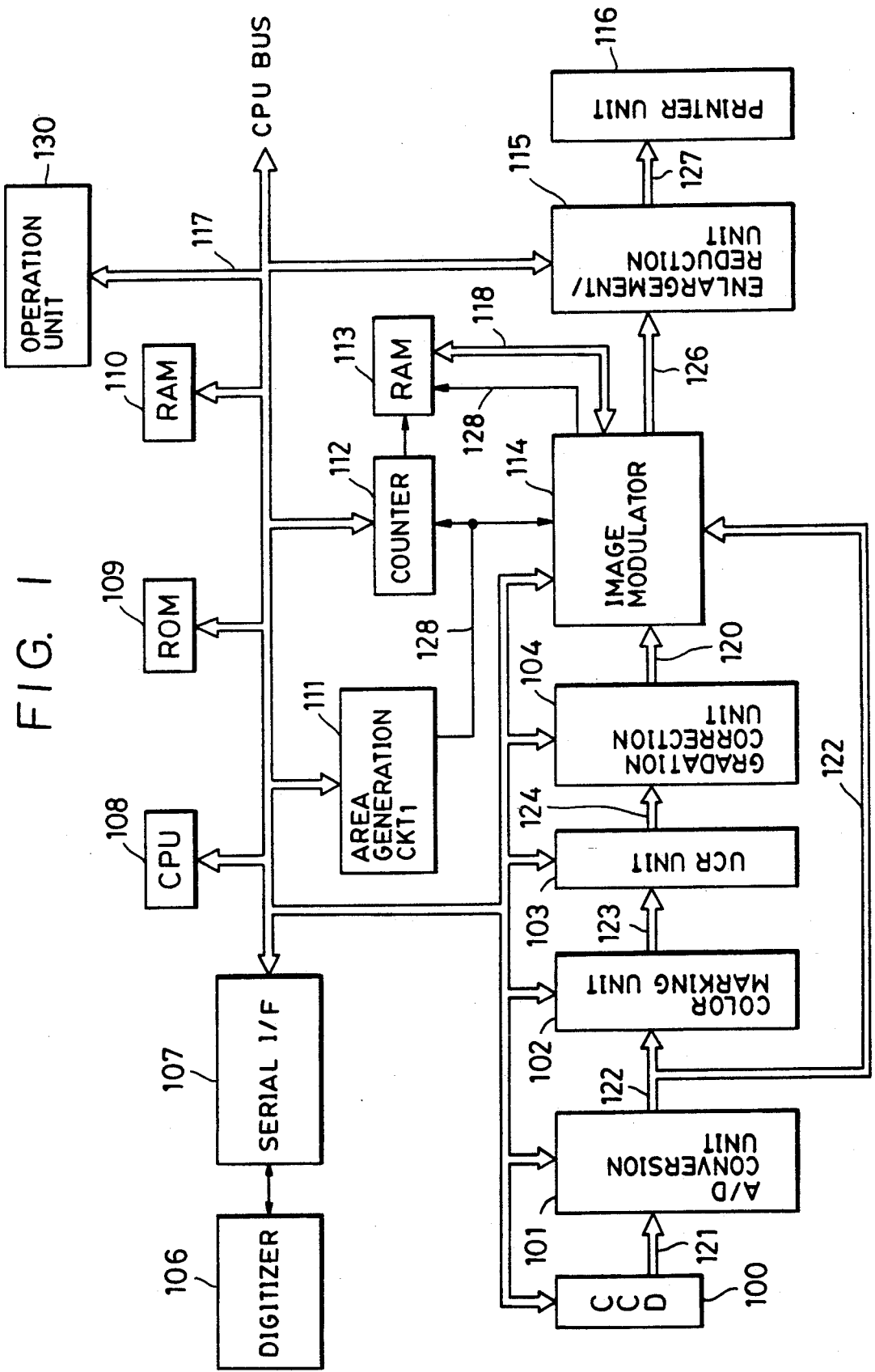
FIG. 1 is a block diagram of an image processing apparatus to which the first preferred embodiment of this invention is applied.

FIG. 1 is a block diagram of an image processing apparatus which performs texture processing according to the first embodiment of this invention.

The apparatus shown in FIG. 1 includes a CPU 108 for processing and calculating which is connected to a CPU bus 117, a ROM 109 for storing a program, etc., a RAM 110 for auxiliary storage, an operation unit 130 for setting various parameters as explained below, a CCD 100, an A/D conversion unit 101, a color masking unit 102, an undercolor removing unit 103, a gradation correction unit 104 for performing γ (gamma) conversion, an image modulator 114 for performing the texture processing on the basis of image data 120 received from the gradation correction unit 104 and data from another RAM 113, an area generation circuit 111 for generating an area signal (particularly, the area signal is used as an enable signal to enable a counter 112 and to enable texture processing), and an enlargement/reduction unit 115 for performing an enlarging/reducing process in the horizontal direction on image data 126 output from image modulator 114. A digitizer 106 is connected to the apparatus through a serial I/F 107.

Figure 2:
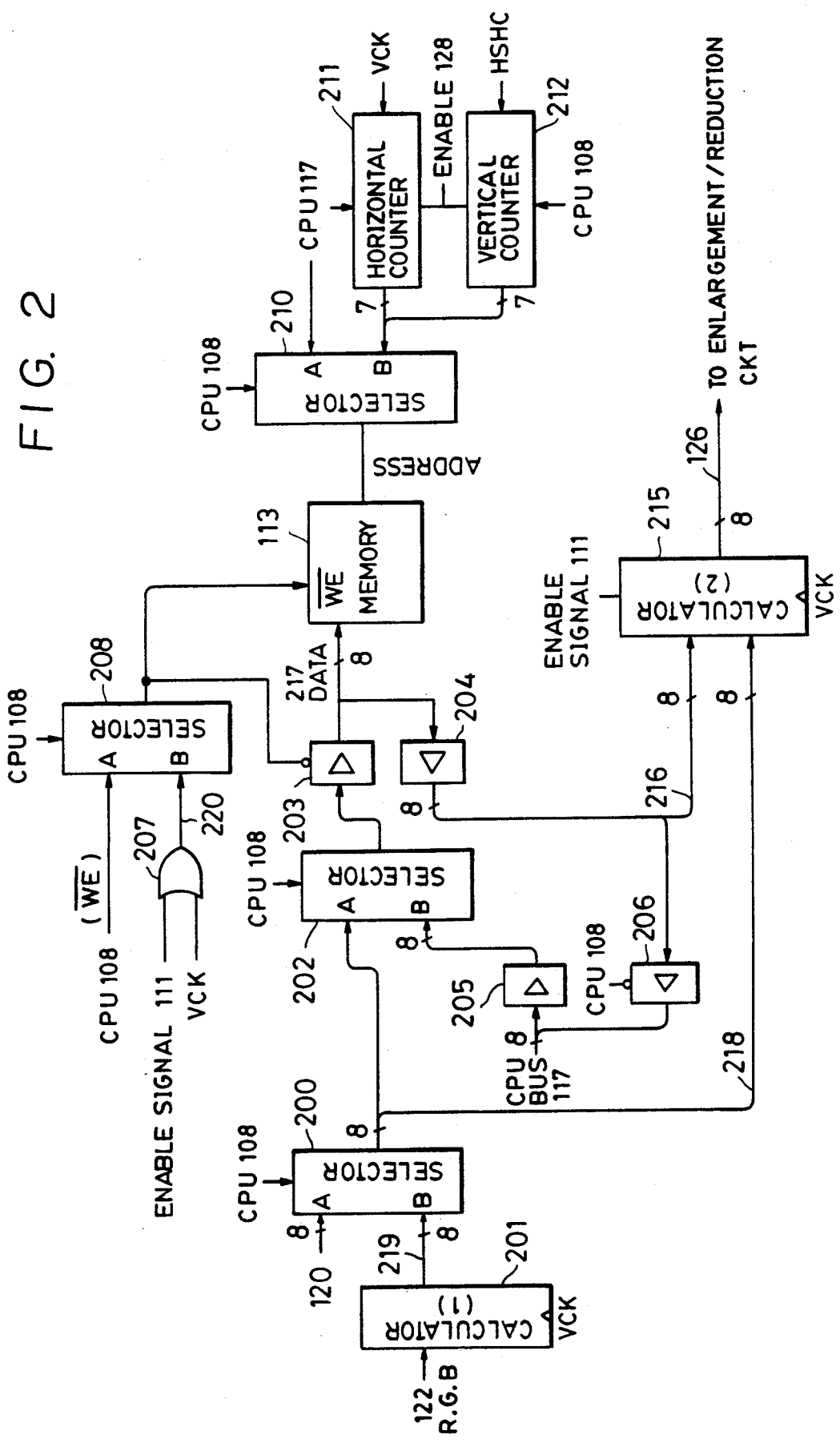
FIG. 2 is a block diagram for explaining a texture processing circuit.
Figure 3A:
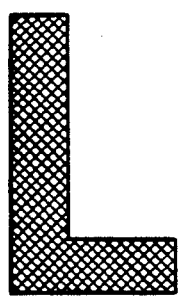
FIG. 3A through FIG. 3C are diagrams for explaining general texture processing.
Figure 3B:
Figure 3C:
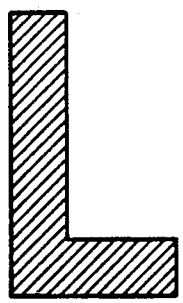

FIG. 2 is a diagram for explaining the texture processing circuit. Explanation will now be made individually with respect to the operation of writing modulation data 217 into the RAM 113 and calculating modulated data 126 from data 216 from the RAM 113 and from image data 215 (the texture processing).

WRITING OF THE DATA FOR MODULATION INTO THE RAM 113

1. Operation of Writing Image Pattern Data

A first calculator 201 includes a converter for receiving input signals 122 of R (red), G (green), and B (blue) and outputting signals of Y (yellow), M (magenta), and C (cyan) and a YMC mean value circuit. Calculator 201 outputs eight-bit signals 219 having the value (Y+M+C)/3, that is density data, from the inputted RGB signals. The CPU 108 selects between the A and B inputs of selectors 200 and 202. In this operation, the CPU 108 selects the B input of selector 200 (data 219) and the A input of selector 202 (the output of selector 200). Consequently, the density data 219 is inputted to driver 203.

The CPU 108 also selects the B input of another selector 208, and an enable signal 220 is inputted to a $\overline{WE}$ terminal of memory 113 and to driver 203. The driver 203 writes the density data 219, which is stored temporarily, into the memory 113 in response to the enable signal 220.

A memory address signal is produced by a vertical counter 212, which counts a horizontal sync signal HSYNC, and a horizontal counter 211, which counts an image clock VCK, and supplied to the B input of selector 210. The memory address signal is inputted by selector 210 to an address in memory 113.

2. Writing of the Pattern Data by the CPU

It is also possible to write the data for the texture pattern into the memory through the CPU bus 117. That is, the same effect, to write the density data into the memory 113 by reading an original as described above, can instead be obtained by writing the pattern data, which is stored, in advance in an external storing apparatus or the like, into the memory 113 through the CPU bus 117.

The procedure for writing the pattern data through the CPU bus 117 will now be described.

The B input of selector 202 is selected by an instruction of the CPU 108, and the pattern data is inputted to the memory 113 through drivers 205 and 203 from the CPU bus 117. Selector 208 selects a $\overline{WE}$ signal (input A) from the CPU bus 117 for controlling writing of the pattern data and supplies the $\overline{WE}$ signal to the memory 113. The memory address for writing is controlled by means of the address bus of the CPU 108, by selection of the A input of selector 210.

The Texture Processing

The calculation of texture-processed data 126 from data 216 and image data 218 is performed by a second calculator 215. Calculator 215 is structured with a multiplier in this embodiment. The procedure for the texture processing will now be described.

The pattern data stored in the RAM 113 is read out and is inputted to the calculator 215 through a driver 204. The image data 120, which is to be texture processed, is inputted to calculator 215 through selector 200. The multiplication of the pattern data 216 and the image data 120 is performed in calculator 215 in accordance with an enable signal 111.

This multiplication of the pattern data 216 and the image data 120 is executed only where desired in the image, under the control of the enable signal 111, which controls whether the texture process is executed or not. When the enable signal 111 is in the "disable" state, the image data 120 is simply passed, unmodulated, through calculator 215, and is outputted as image data 126. Accordingly, the texture processing can be executed just on an area designated by the enable signal 111.

Figure 5:
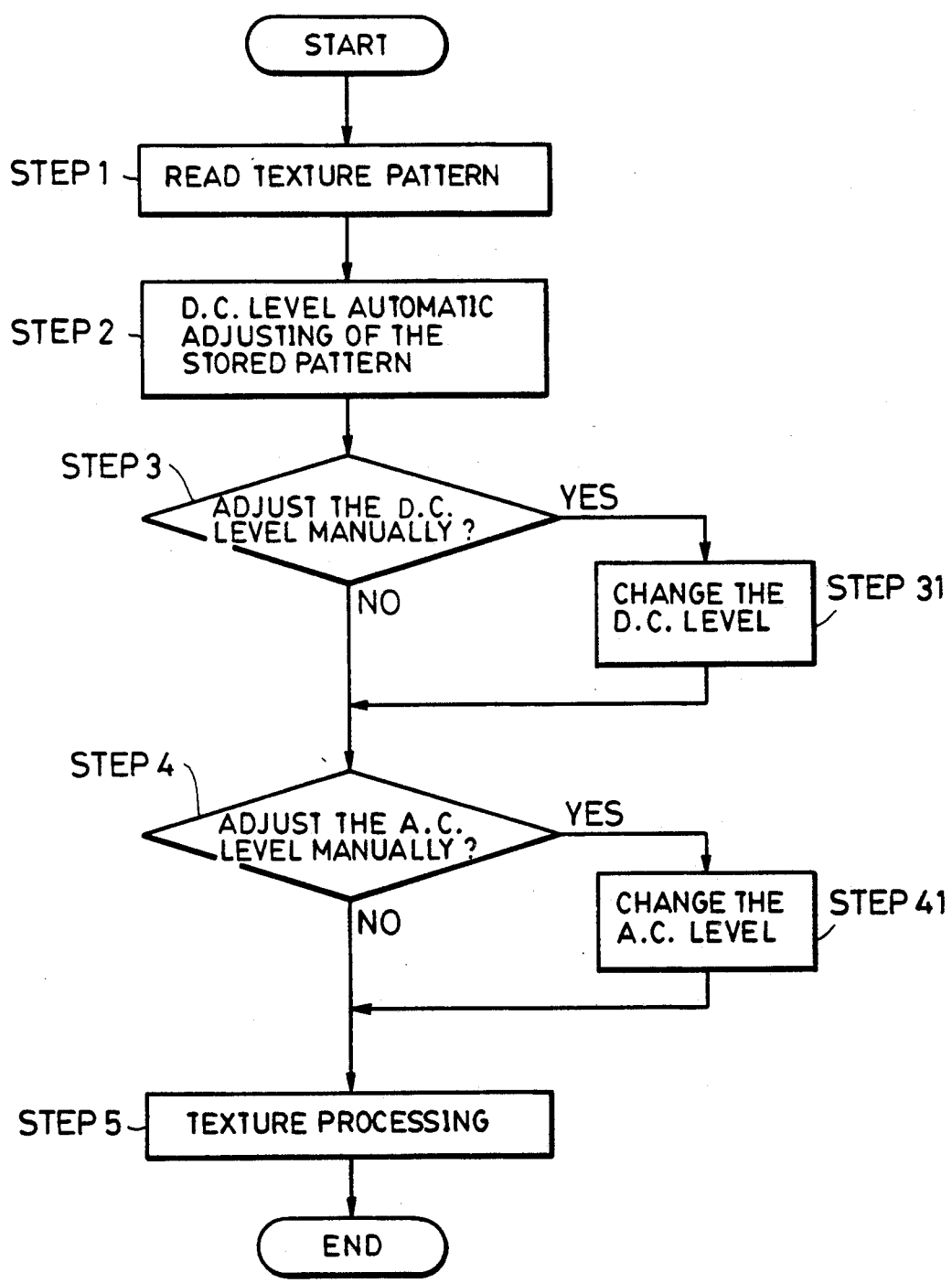
FIG. 5 is a flow chart of an algorithm for processing performed by an image processing apparatus according to this invention.

FIG. 5 is a diagram for explaining an algorithm used in this embodiment.

In step 1, an original document set on a platen (not shown) is read and the density data of the original is stored in the bit map memory 113. In step 2, the D.C. level of the stored pattern is automatically adjusted. As illustrated in FIG. 4(a) and FIG. 4(c), in step 2, the D.C. level of the stored pattern is raised when the D.C. level is less than a predetermined density level. On the other hand, as illustrated in FIG. 4(b) and FIG. 4(c), the D.C. level of the stored pattern is lowered when more than the predetermined density level. The adjusted stored pattern is inputted to one of the inputs of calculator 215. If calculator 215 is a multiplier, the adjusted D.C. level of the stored pattern corresponds to a multiplier of 1. That is, if the D.C. level of signal 120 is the same as that of the pattern illustrated in FIG. 4(b), then, because the information stored in memory 113 has already had its D.C. level automatically adjusted, the output (modulated) signal 126 will have the same D.C. level as does input video signal 120 (e.g., FIG. 4(b)).

Figure 6:
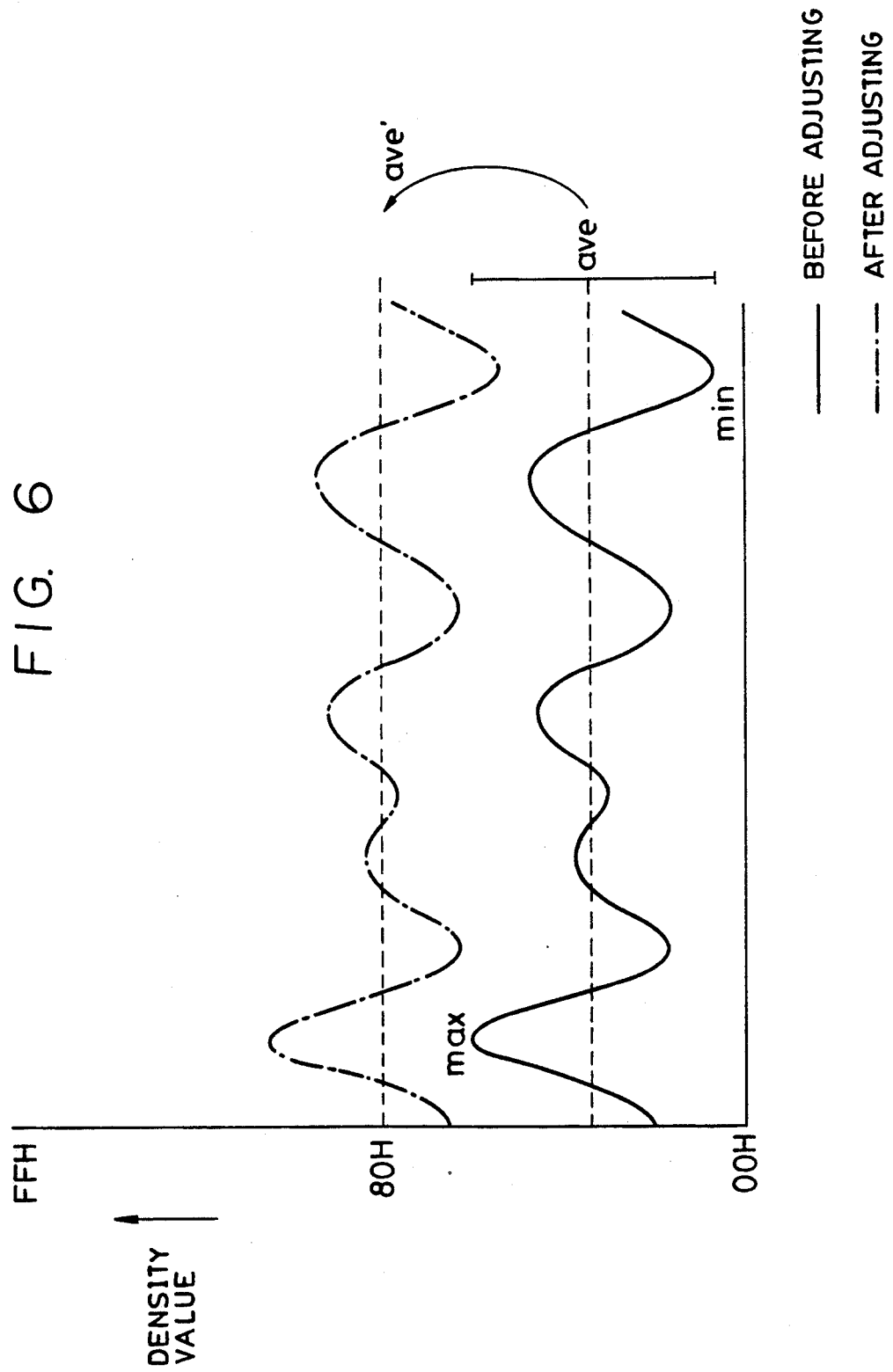
FIG. 6 is an illustration of the automatic adjustment of the D.C. level of a pattern.

FIG. 6 is an illustration of a processing performed by means of this algorithm. The texture pattern before the D.C. level adjustment is illustrated with a solid line in FIG. 6. The D.C. level of the texture pattern is obtained by finding out the maximum value and the minimum value in all the texture pattern, and by calculating (maximum+minimum)/2 to obtain an average value. The average value, i.e., the D.C. level of the texture pattern, is shown in FIG. 6 as a dashed line labeled "ave". In the case where calculator 215 is a multiplier, a calculation for all the stored pattern is performed to make the D.C. level of the stored pattern correspond to a factor of 1 (e.g., 80H level in this case, where H indicates a hexadecimal number) as the multiplier.

The adjusted D.C. level of the stored pattern obtained by this calculation, i.e., the 80H level, is illustrated as a dashed line labeled "ave'" in FIG. 6. The texture pattern after the D.C. level adjustment is illustrated as a dot-and-dash line in FIG. 6. The adjusted texture pattern is obtained by adding the value (ave'-ave) to the texture pattern illustrated as a solid line in FIG. 6.

This processing can be performed automatically by software of the CPU 108. That is, the pattern data 216, which is read out from the bit map memory 113 in FIG. 2, is transmitted to the CPU 108 through the CPU bus 117, and the CPU 108 calculates the value (maximum+minimum)/2 of the pattern data to obtain the average value of the pattern data, and adds the value (ave'-ave) to the pattern data. The "ave'" value corresponds to (maximum+minimum)/2 of the adjusted pattern data. The CPU 108 executes the texture processing by inputting the result of this calculation to calculator 215. The automatic adjustment in step 2 can be performed by setting an appropriate value as the "ave'" value in the CPU 108 in advance.

It is also possible to set the "ave'" value manually by using the operation unit 130. (In step 31, manual adjustment of the D.C. level is performed.) The above-described adjustment can be performed before writing the pattern data to the bit map memory 113 instead of adjusting the D.C. level just before inputting the pattern data to calculator 215. It would also be noted that other calculation hardware can be used for adjusting the D.C. level, instead of CPU 108.

In step 41, A.C. level adjustment of the pattern data is performed manually by an operator, who sets the adjustment level of the pattern data via the operation unit 130.

Figure 7:
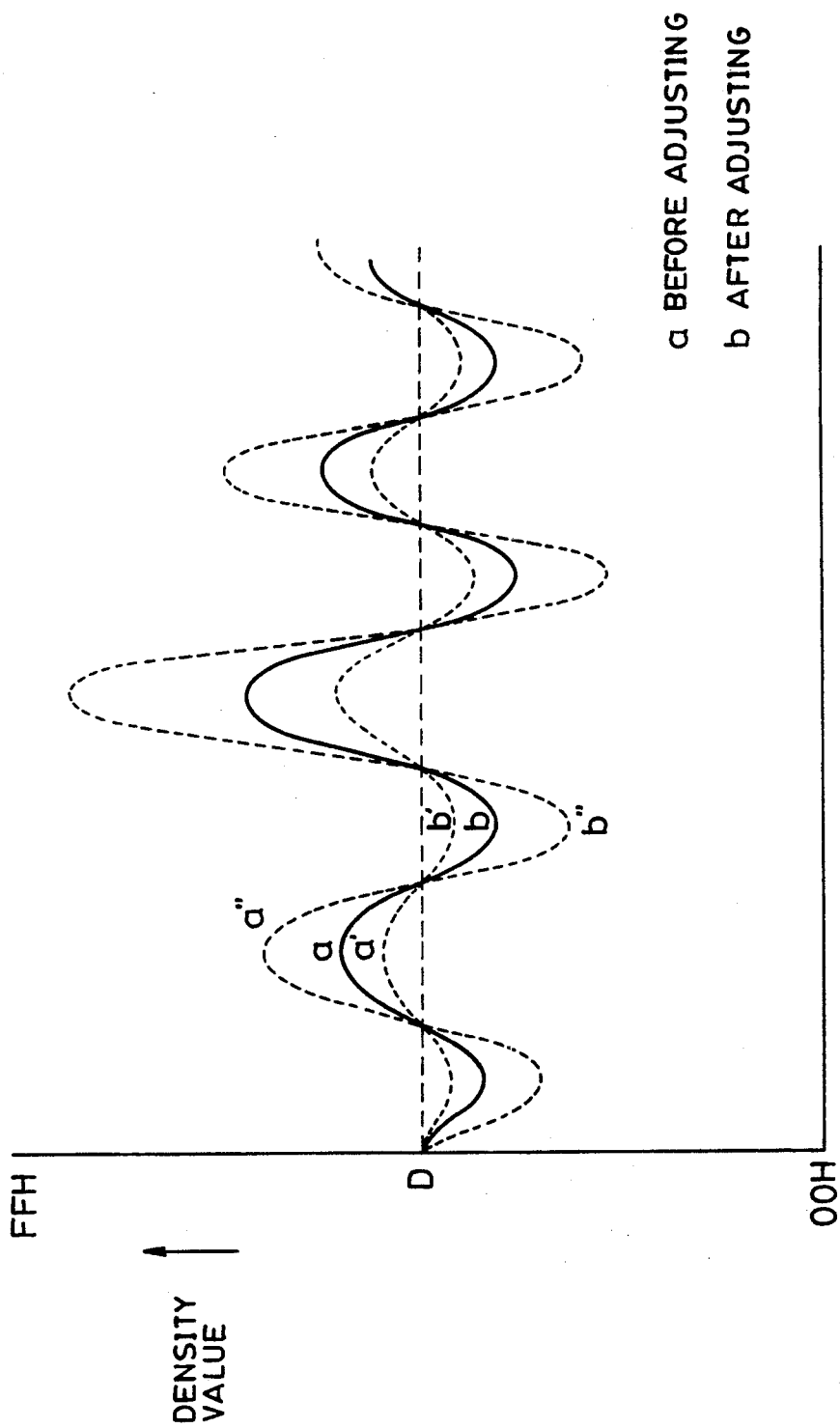
FIG. 7 is an illustration of manual adjustment of the A.C. level of a pattern.

FIG. 7 is an illustration of manual A.C. level adjustment of the pattern data. The A.C. level adjustment is performed based on the following formula.

$$X' = D + (X-D)\alpha$$

where X' denotes the pattern data after adjustment, X denotes the pattern data before adjustment, D denotes the D.C. level of the pattern data, and α denotes a coefficient set by the operation unit 130.

As shown in FIG. 7, the amplitude of the pattern data before adjustment, which is denoted by "a" and "b", is adjusted to an amplitude denoted by "a'" and "b'" in the case where, by way of example, α=0.5. Similarly, the amplitude denoted by "a" and "b" is adjusted to the amplitude denoted by "a''''" and "b''''", in the case where $\alpha = 2$.

However, when the density of the adjusted pattern data is beyond a predetermined value (in this embodiment, FFH and 00H are used as the limits) the density value is limited to the predetermined value.

After the completion of the automatic D.C. level adjustment, the manual D.C. level adjustment and the manual A.C. level adjustment, the texture processing is executed in step 5 as described above, to obtain an output image.

In the above embodiment, automatic A.C. level adjustment of the pattern data has not been mentioned. However, it can be executed easily as follows.

The automatic A.C. level adjustment can be executed by calculating the value maximum −(maximum+minimum)/2 or the value (maximum+minimum)/2 −minimum of the pattern data automatically, regardless of the data in the read pattern, and by writing the calculation result in memory as the value of the coefficient $\alpha$. The automatic A.C. level adjustment may be executed between step 2 and step 3.

As described above, automatic D.C. level adjustment, manual D.C. level adjustment, automatic A.C. level adjustment and manual A.C. level adjustment can be executed in the course of processing the image.

In the above-described embodiment, the second body of image data has been modulated after adjustment of the D.C. level of the texture pattern based on a first body of image data. However, it is also possible to adjust the D.C. level of the modulated second image data based on the first image data after performing the texture processing on the second body of image data.

In the above-described embodiment, the first image data is drawn once in the memory. However, it is also possible to enter the first and second bodies of image data simultaneously, and to perform the texture processing in real time by providing plural input means. In this case, there are the advantages that the texture processing can be executed without using a memory, that the hardware construction of the apparatus is simplified, and that the processing speed is much improved.

Using the embodiment described above, texture processing which is not affected by density of the texture pattern can be executed easily by adjusting the D.C. level of the texture pattern automatically.

Further, since an operator can adjust the D.C. level or the A.C. level of the texture pattern arbitrarily, it is possible to modulate the image data with an optional intensity or with an optional amplitude, thereby providing the advantage that the apparatus can be widely applied to the design field.

Embodiment 2

Figure 8:
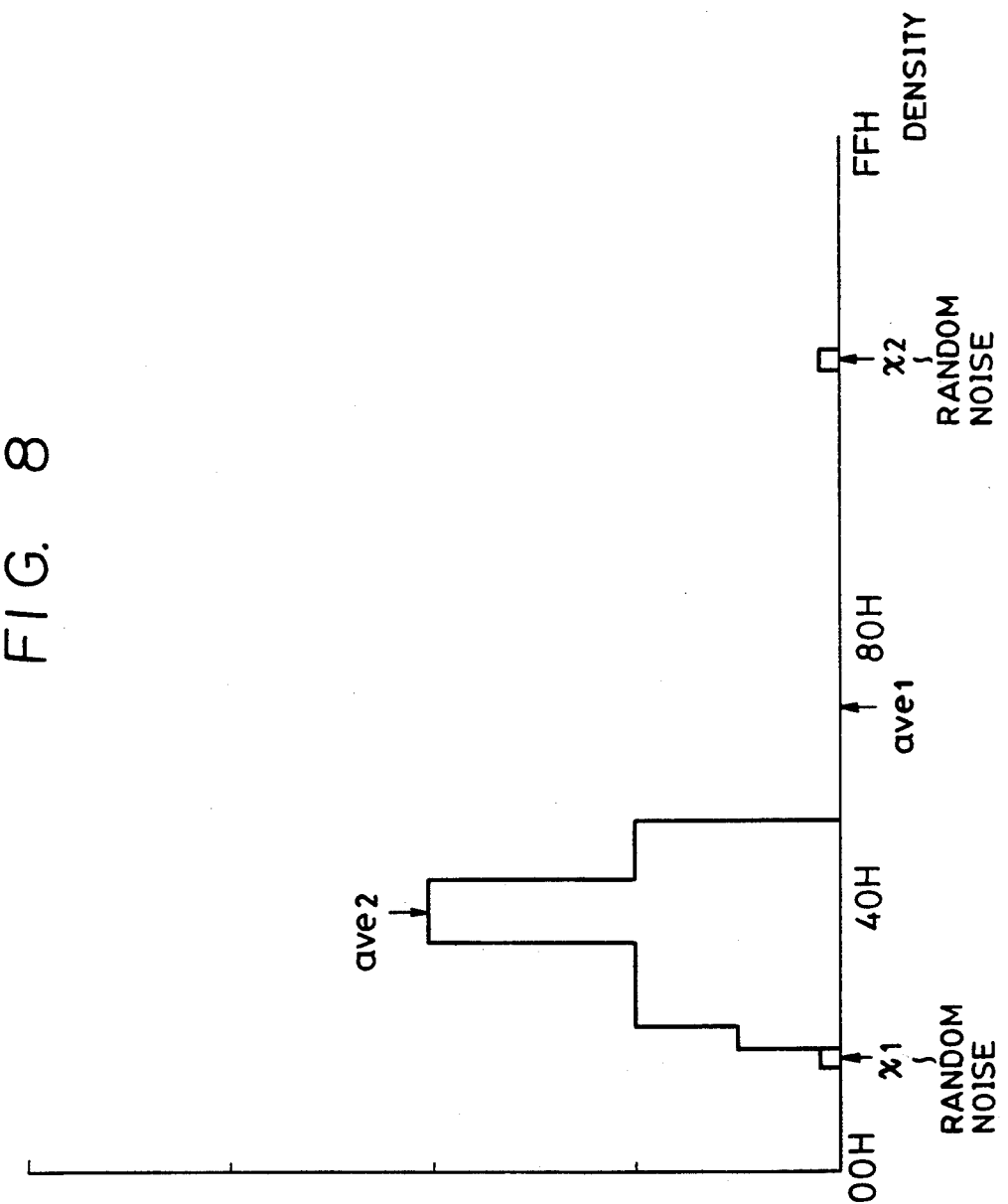
FIG. 8 is a diagram for explaining the second preferred embodiment of this invention.

The second preferred embodiment can be realized by replacing the method for adjusting the D.C. level in embodiment 1. In embodiment 1, the D.C. level is obtained easily by a simple calculation because the D.C. level before adjustment corresponds to the calculation of the value (maximum+minimum)/2. However, there is a disadvantage in that the calculation is affected by noise, e.g., a dust component in the texture pattern. FIG. 8, a diagram for explaining the disadvantage, is a histogram showing the whole read pattern.

Assuming that the algorithm of embodiment 1 is used, the maximum value corresponds to "$X_2$", and the minimum value corresponds to "$X_1$", whereby the D.C. level before adjustment corresponds to "ave 1". There is little difference between the value "ave 1" and 80H, whereby the whole density of the texture-processed image goes down in spite of the D.C. level automatic adjusting.

Accordingly, the apparatus of the second embodiment performs automatic D.C. level adjustment by making a histogram of the stored pattern, and by setting the maximum number of occurrences as the D.C. level before adjustment, i.e., "ave 2". With the apparatus of embodiment 2, automatic D.C. level adjustment not affected by a small number of noise components can be executed.

In this case, when the density of the adjusted pattern data is beyond a predetermined value (e.g., 00H, FFH), it is proper to limit the density value to the predetermined value.

Embodiment 3

The third embodiment shows a hardware construction for A.C. level adjustment. To put it concretely, embodiment 3 can be provided by replacing calculator 215 in FIG. 2 with the construction in FIG. 9.

Figure 9:
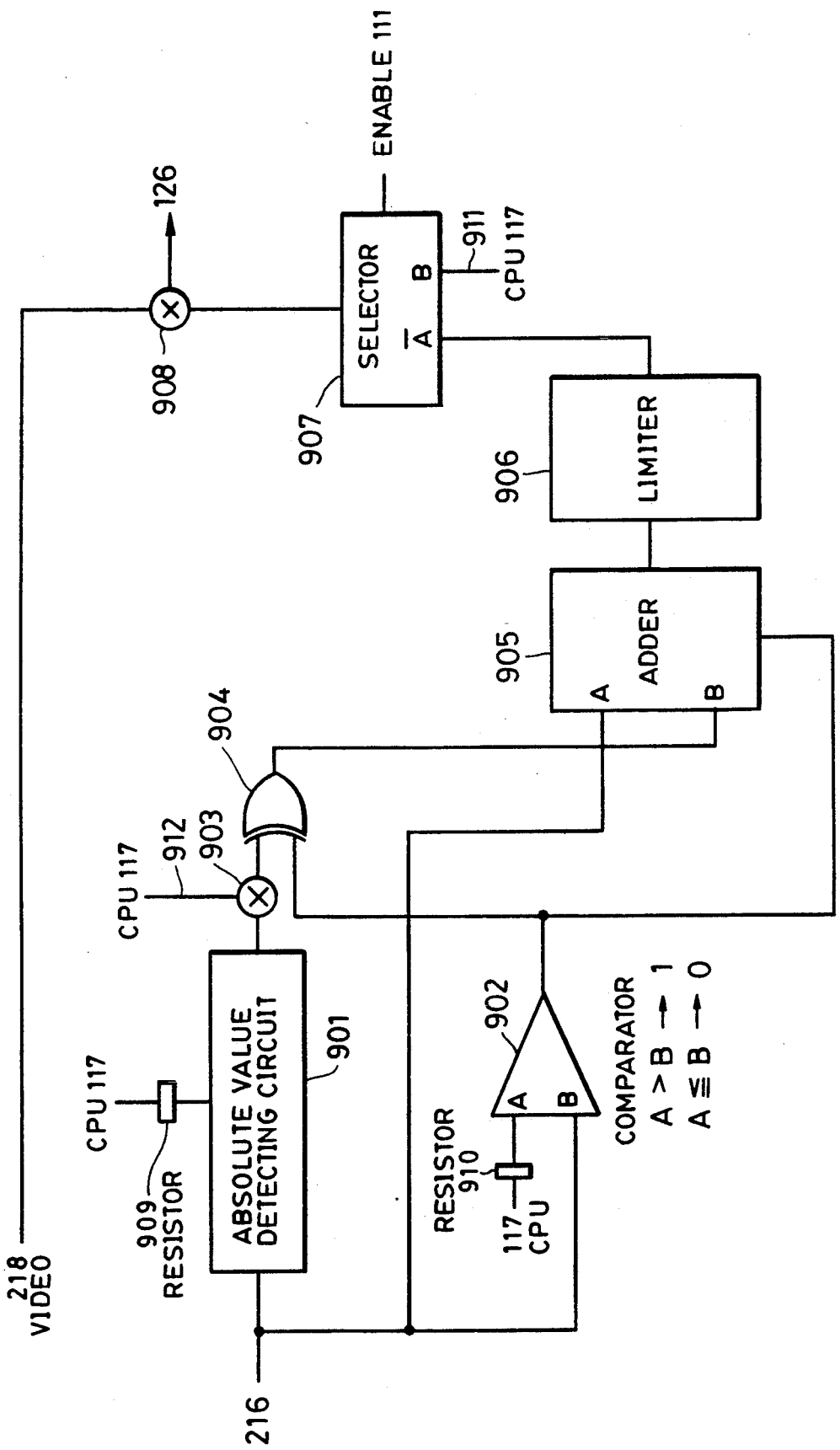
FIG. 9 is a block diagram showing a hardware construction of a circuit for adjustment of the A.C. level in a third preferred embodiment of this invention.

The circuit in FIG. 9 is structured with multipliers 903 and 908, an absolute value detecting circuit 901, a comparator 902, an exclusive -OR logic circuit 904, an adder 905, a limiter 906, and a selector 907. The absolute value detecting circuit 901 calculates the absolute value of the difference between the stored pattern data having an automatically-adjusted instantaneous D.C. level and the D.C. level. The comparator 902 compares the stored pattern data with the latter D.C. level to determine whether the stored pattern data is larger than the D.C. level or not.

Registers 909 and 910 set by the CPU 108 are provided. For instance, the value "80H" may be set into these registers. A signal line 912 is provided for setting a predetermined coefficient based on a parameter set by the operation unit 130, which is adjusted by an operator. A multiplication of the predetermined coefficient and the value detected by the absolute value detecting circuit 901 is performed. The exclusive -OR logic circuit 904 performs an exclusive -OR logic operation between a binary data (one bit) outputted from the comparator 902 and each of a series of bit signals of multilevel data outputted from multiplier 903 as a result of the multiplication. In the case where the stored pattern data is larger than the D.C. level (the output of the comparator 902 represents "0"), the result of the multiplication and the stored pattern data are added together because the output data of Multiplier 903 is inputted to adder 905 without transformation. In the case where the stored pattern data is smaller than the D.C. level (the output of the comparator 902 represents "1"), the difference between the stored pattern data and the result is calculated because adder 905 receives at input B the complement-of-two of the output data of the multiplier. The texture processing can be executed by multiplying video data 218 and the output of an adder 905 in a multiplier 908. Manual A.C. level adjustment is performed by this hardware construction.

In embodiment 3, although the scale of the hardware construction may be bigger, the texture processing can be executed properly for each manual A.C. level setting.

Further, since the need for the operation of rewriting the memory is removed, and only the automatic D.C. level adjustment is performed by software, it lightens the burden involved in the programming. The above mentioned parameter can be memorized in the CPU 108 in advance, making it also possible to execute a predetermined A.C. level adjustment automatically.

Embodiment 4

Figure 10:
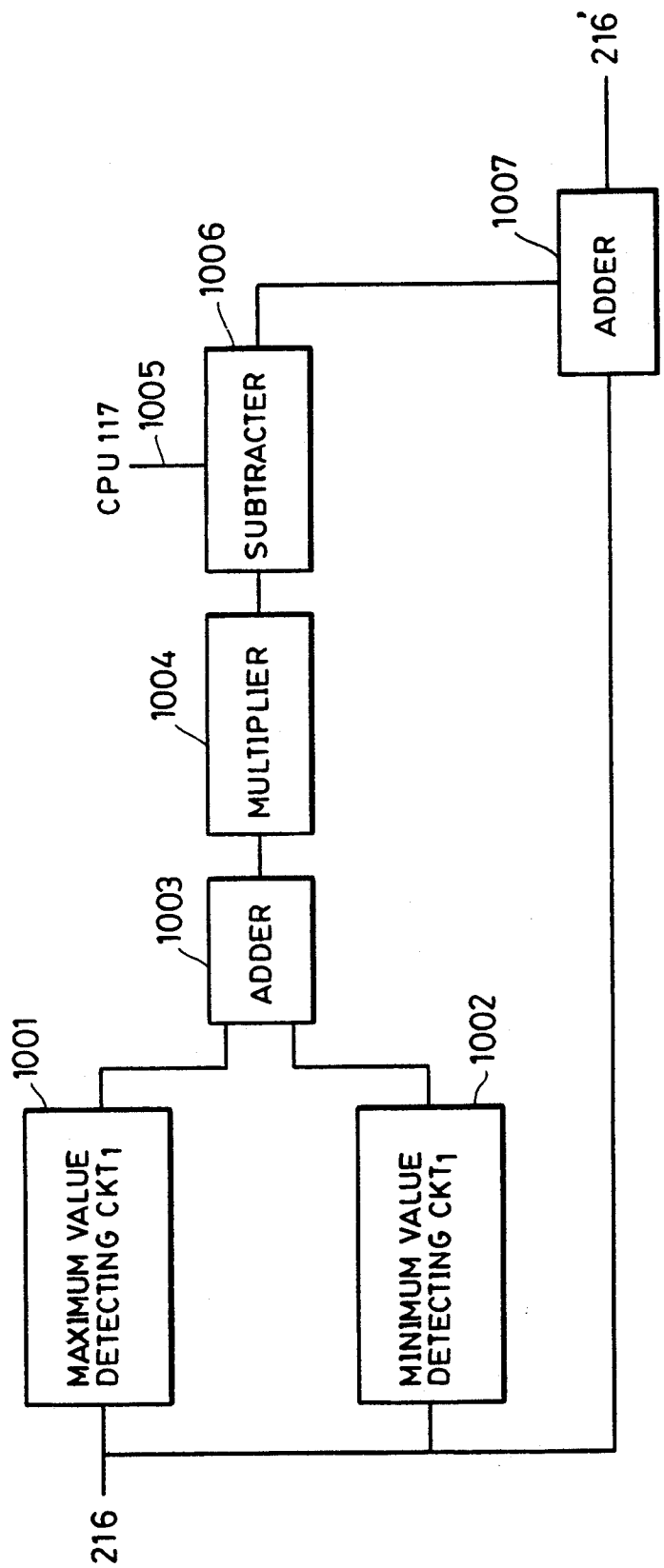
FIG. 10 is a block diagram showing a hardware construction of a circuit for adjusting D.C. level, in a fourth preferred embodiment of this invention.

FIG. 10 is a diagram for explaining the fourth embodiment of this invention.

The fourth embodiment shows a concrete hardware construction for D.C. level adjustment. In FIG. 10, a maximum value detecting circuit 1001 and a minimum value detecting circuit 1002 are provided for detecting the maximum value and the minimum value of the pattern data 216, respectively. An adder 1003 is provided for adding the maximum value and the minimum value. A multiplier 1004 multiplies the result obtained by the adder 1003 by one-half, and outputs the average value "ave" of the pattern data, i.e., the value (maximum+minimum)/2. A subtracter 1006 subtracts from the adjusted D.C. level "ave'", which is set by the CPU 108, the average value "ave" of the pattern data. An adder 1007 adds the value (ave'-ave) to be adjusted to the pattern data, and outputs the D.C.-level-adjusted pattern data.

According to embodiment 4, the D.C. level of the pattern data can be adjusted using a simple hardware construction.

The term "pattern" is not to be taken as implying any special regularity or periodicity in the first set of data; rather, the content of that data is arbitrary as far as concerns the present invention.

As mentioned above, according to the present invention, proper texture processing, which is not affected by density of the texture pattern can be executed.

What is claimed is:

1. An image processing apparatus comprising:
    input means for inputting first image data representing a first image and second image data representing a second image which is different from the first image;
    modulation means for modulating a density of the second image data in accordance with the first image data; and
    adjusting means for causing an image represented by the modulation second image data to be at a predetermined density level.

2. An image processing apparatus according to claim 1, further comprising manual setting means, for setting a D.C. level of the first image data manually.

3. An image processing apparatus according to claim 1, further comprising manual setting means, for setting an A.C. level of the first image data manually.

4. An image processing apparatus according to claim 1, wherein said adjusting means is for adjusting automatically an A.C. level of the second image data, after modulation.

5. An image processing apparatus comprising:
    input means for inputting first image data representing a first image and second image data representing a second image which is different from the first image;
    level-adjusting means for automatically adjusting a level of the first image data; and
    modulation means for modulating a density of the second image data in accordance with the first image data, after level-adjustment of the first image data by said level-adjusting means.

6. An apparatus according to claim 5, wherein said level-adjusting means is for automatically adjusting a D.C. level of the first image data.

7. An apparatus according to claim 5, wherein said level-adjusting means is for automatically level-adjusting an A.C.-level of the first image data.

8. An apparatus according to claim 5, further comprising manual level-adjusting means for adjusting a level of the first image data in response to instruction to do so by an operator.

9. An apparatus according to claim 5, further comprising second adjusting means, for controlling operation of said modulation means automatically to adjust a level of modulated data output by said modulation means.

10. An image processing apparatus comprising:
    input means for inputting first image data representing a first image and second image data representing a second image which is different from the first image;
    modulation means for modulating a density of the second image data in accordance with the first image data; and
    adjusting means for adjusting a level of the modulated second image data in order that an image represented by the modulated second image is at a predetermined density level.

11. An image processing apparatus according to claim 10, wherein said adjusting means includes memory means for storing the first image data.

12. An image processing apparatus according to claim 11, wherein said adjusting means includes changing means for automatically changing a level of the first image data stored in the memory means.

13. An image processing apparatus according to claim 10, wherein said adjusting means is capable of adjusting a D.C. level of the modulated second image data and a A.C. level of the modulated second image data individually.

14. An image processing apparatus comprising:
    input means for inputting first image data representing a first image and second image data representing a second image which is different from the first image;
    modulation means for modulating a density of the second image data in accordance with the first image data; and
    adjusting means for adjusting a level of the modulated second image data before modulation in order than an image represented by the modulated second image is at a predetermined density level.

15. An image processing apparatus according to claim 14, wherein said adjusting means includes automatic adjusting means for automatically adjusting a D.C. level of the first image data.

16. An image processing method comprising the steps of:
    inputting first image data representing a first image and second image data representing a second image which is different from the first image;
    modulating a density of the second image data in accordance with the first image data; and
    effecting adjustment such that an image represented by the modulated second image data is at a predetermined density level.

17. An image processing method according to claim 16, further comprising the step of setting a D.C. level of the first image data manually.

18. An image processing method according to claim 16, further comprising the step of setting a A.C. level of the first image data manually.

19. An image processing method according to claim 16, wherein said adjustment-effecting step comprises adjusting automatically an A.C. level of the second image data, after modulation.

20. An image processing method comprising the steps of:
    inputting first image data representing a first image and second image data representing a second image which is different from the first image;
    automatically adjusting a level of the first image data; and
    modulating a density of the second image data in accordance with the first image data, after level-adjustment of the first image data in said adjusting step.

21. A method according to claim 20, wherein said adjusting step comprises automatically adjusting a D.C. level of the first image data.

22. A method according to claim 20, wherein said adjusting step comprises automatically adjusting an A.C. level of the first image data.

23. A method according to claim 20, further comprising the step of adjusting a level of the first image data in response to a manual instruction by an operator to do so.

24. A method according to claim 20, further comprising the step of controlling performance of said modulating step automatically to adjust a level of modulated data.

25. An image processing method comprising the steps of:
    inputting first image data representing a first image and second image data representing a second image which is different from the first image;
    modulating the second image data in accordance with the first image data; and
    adjusting a level of the modulated second image data in order than an image represented by the modulated second image is at a predetermined density level.

26. An image processing method according to claim 25, wherein said adjusting step includes storing the first image data.

27. An image processing method according to claim 26, wherein said adjusting step includes automatically changing a level of the first image data stored in said storing step.

28. An image processing method according to claim 25, wherein said adjusting step comprises adjusting a D.C. level of the modulated second image data and an A.C. level of the modulated second image data, individually.

29. An image processing method comprising the steps of:
    inputting first image data representing a first image and second image data representing a second image which is different from the first image;
    modulating the second image data in accordance with the first image data; and
    adjusting a level of the first image data before modulation in order than an image represented by the modulated second image data is at a predetermined level.

30. An image processing method according to claim 29, wherein said adjusting step includes automatically adjusting a D.C. level of the first image data.

* * * * *

UNITED STATES PATENT AND TRADEMARK OFFICE
CERTIFICATE OF CORRECTION

PATENT NO. : 5,187,593

DATED : February 16, 1993

INVENTOR(S) : MITSURU KURITA, ET AL.

It is certified that error appears in the above-identified patent and that said Letters Patent is hereby corrected as shown below:

ON THE TITLE PAGE:

Under Assistant Examiner

"Jerome Grant, III" should read --Jerome Grant, II--.

IN [57] ABSTRACT

Line 5, "a" should read --an--.

COLUMN 6

Line 51, "Multiplier 903" should read --multiplier 903--.

COLUMN 7

Line 40, "image;" should read --image, the first and second image data, respectively, consisting of multi-value pixel data;--.
Line 42, "image data" should read --image represented by the second image data--.
Line 45, "modulation" should read --modulated--.
Line 62, "image;" should read --image, the first and second image data, respectively, consisting of multi-value pixel data;--.
Line 66, "image data" should read --image represented by the second image data--.

COLUMN 8

Line 6, "A.C.-level" should read --A.C. level--.
Line 20, "image;" should read --image, the first and second image data, respectively, consisting of multi-value pixel data;--.

UNITED STATES PATENT AND TRADEMARK OFFICE
CERTIFICATE OF CORRECTION

PATENT NO. : 5,187,593
DATED : February 16, 1993
INVENTOR(S) : MITSURU KURITA, ET AL.

Page 2 of 3

It is certified that error appears in the above-identified patent and that said Letters Patent is hereby corrected as shown below:

COLUMN 8

Line 22, "image data" should read --image represented by the second image data--.
Line 38, "a" should read --an--.
Line 44, "image;" should read --image, the first and second image data, respectively, consisting of multi-value pixel data;--.
Line 46, "image data" should read --image represented by the second image data--.
Line 60, "image;" should read --image, the first and second image data, respectively, consisting of multi-value pixel data;--.
Line 61, "image data" should read --image represented by the second image data--.

COLUMN 9

Line 2, "a" should read --an--.
Line 12, "image;" should read --image, the first and second image data, respectively, consisting of multi-value pixel data;--.
Line 16, "image data" should read --image represented by the second image data--.

COLUMN 10

Line 3, "image;" should read --image, the first and second image data, respectively, consisting of multi-value pixel data;--.

UNITED STATES PATENT AND TRADEMARK OFFICE
CERTIFICATE OF CORRECTION

PATENT NO. : 5,187,593
DATED : February 16, 1993
INVENTOR(S) : MITSURU KURITA, ET AL.

It is certified that error appears in the above-identified patent and that said Letters Patent is hereby corrected as shown below:

<u>COLUMN 10</u>

Line 26, "image;" should read --image, the first and second image data, respectively, consisting of multi-value pixel data;--.

Signed and Sealed this

Twenty-fifth Day of January, 1994

Attest:

BRUCE LEHMAN

*Attesting Officer*    *Commissioner of Patents and Trademarks*